Oct. 21, 1947. F. J. STEVERMER 2,429,568
FISH LURE
Filed March 11, 1946
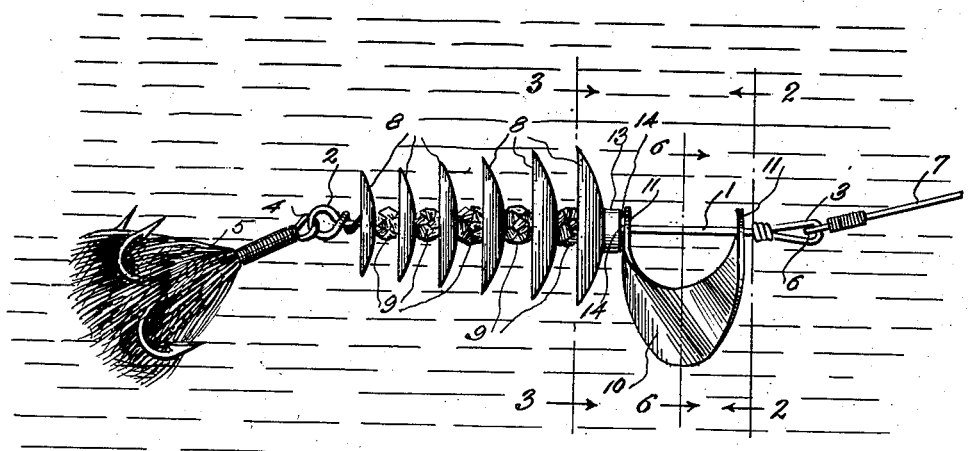
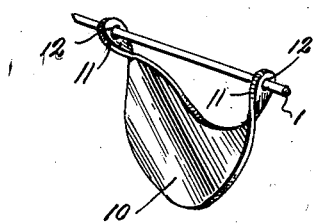
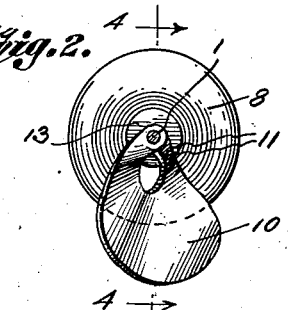
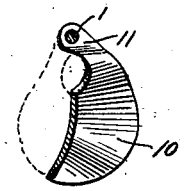
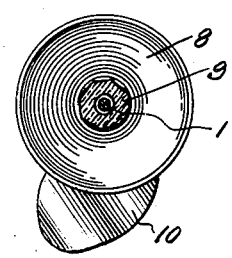
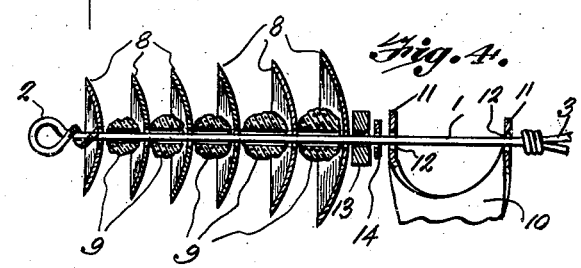
Inventor
FRANK J. STEVERMER Patented Oct. 21, 1947

2,429,568

UNITED STATES PATENT OFFICE 2,429,568

FISH LURE

Frank J. Stevermer, Rio Vista, Calif.

Application March 11, 1946, Serial No. 653,540

1 Claim. (Cl. 43—45)

This invention relates to a fish lure and it is one object of the invention to provide a lure so formed that when it is drawn through water it will closely resemble a swimming fish of the type consumed by fish which it is desired to catch and serve very effectively to attract the fish to be caught.

Another object of the invention is to provide a lure having a body portion consisting of discs loosely mounted upon a strand of stiff wire, the discs being of concavo-convexed formation and progressively decreasing in diameter toward the rear end of the wire strand and spaced from each other by beads which prevent contact of the discs with each other.

Another object of the invention is to provide a lure having a fly hook loosely mounted at the rear end of the wire strand and having mounted upon the forward portion of the strand a spinner so formed that it will be rapidly rotated about the strand as the lure is drawn forwardly through water and simulate the head of a swimming fish.

Another objection of the invention is to provide a lure which is simple in construction, capable of being manufactured at small cost, and very efficient in operation.

The invention is illustrated in the accompanying drawings wherein:

Fig. 1 is a side view of the improved fish lure.

Fig. 2 is a view taken along line 2—2 of Figure 1.

Fig. 3 is a sectional view taken along line 3—3 of Figure 1.

Fig. 4 is a sectional view taken longitudinally through the lure.

Fig. 5 is a perspective view of the spinner.

Fig. 6 is a sectional view taken transversely through the spinner along line 6—6 of Figure 1.

This improved fish lure has a mounting member or rod 1 formed from a strand of stiff wire which has its end portions bent to form eyes 2 and 3, the eye 2 being loosely engaged through the eye 4 of a fly hook 5 and the eye 3 being loosely engaged through the eye 6 of a leader 7. A number of discs 8 formed of shiny metal are loosely mounted upon the strand or rod 1 and these discs are held in spaced relation to each other by spacers 9 which are of preferably glass beads but may be formed of any suitable material. The beads are substantially spherical and formed with flat faces or facets, as shown in Figure 1, and when the lure is drawn through water the spacers will reflect light. The circular discs are of concavo-convexed formation with their concaved surfaces presented rearwardly, as shown in Fig. 4, and the discs progressively decrease in diameter toward the rear end of the lure and when the lure is drawn through water the discs and the spacers will be free to turn about the rod and the fact that the discs are of progressively reduced diameter and of the concavo-convexed formation causes air to accumulate between the discs and water about their edges to be agitated and thus cause a mass of aerated water to surround the lure and closely simulate the appearance of a swimming fish. In front of the forward disc is a spinner 10 formed of shiny metal. This spinner is curved longitudinally, similar to the curvature of a propeller, and at its end is formed with ears 11 which are twisted as shown in Fig. 5 and formed with openings 12 to receive the rod 1. The spinner will thus be mounted for movement about the rod by action of the water as the lure is drawn forwardly, and since the spinner projects laterally from the rod a greater distance than the discs water agitated by the spinner as the lure is drawn forwardly will swirl rearwardly about the discs and the fly hook and assist in imparting to the lure the appearance of a swimming fish. A block or collar 13 fits loosely about the rod in front of the forward disc and between this collar and the rear arm of the spinner is a thin washer or disc 14 which fits loosely about the rod and serves as a thrust bearing for the rear end of the spinner.

Having thus described the invention, what is claimed is:

A fish lure comprising a rod formed from a strand of stiff wire having end portions bent to form front and rear eyes, a fly hook loosely engaged with the rear eye, the front eye constituting means for loosely connecting the rod with a rear eye of a leader, discs loosely mounted about said rod and spaced from each other by loosely mounted spacers, the discs being of concavo-convexed formation with their concaved surfaces presented rearwardly and progressively decreasing in diameter towards the rear end of the rod, said spacers being substantially spherical and formed with facets for reflectiing light, a block loosely mounted upon the rod in front of the forward disc, a spinner curved longitudinally and having arms at front and rear ends twisted and formed with openings through which the rod passes to mount the spinner for spinning movement about the rod in front of said block, said spinner projecting from the rod a greater distance than the discs, and a washer fitting loosely about the rod between the block and the rear arm of the spinner and constituting a thrust bearing for the spinner.

FRANK J. STEVERMER.

REFERENCES CITED

The following references are of record in the file of this patent:

UNITED STATES PATENTS

| Number | Name | Date |
|---|---|---|
| 1,495,832 | Aiken | May 27, 1924 |
| 1,893,686 | Schilpp | Jan. 10, 1933 |
| 2,013,898 | Ridenour | Sept. 10, 1935 |
| 1,822,785 | Petrie | Sept. 8, 1931 |
| 1,897,529 | Palmer et al. | Feb. 14, 1923 |
| 1,393,617 | Frame | Oct. 11, 1921 |

FOREIGN PATENTS

| Number | Country | Date |
|---|---|---|
| 198,571 | Great Britain | June 7, 1923 |